M. F. SMITH.
Device for Preserving Seed Corn.
No. 229,015.
Patented June 22, 1880.
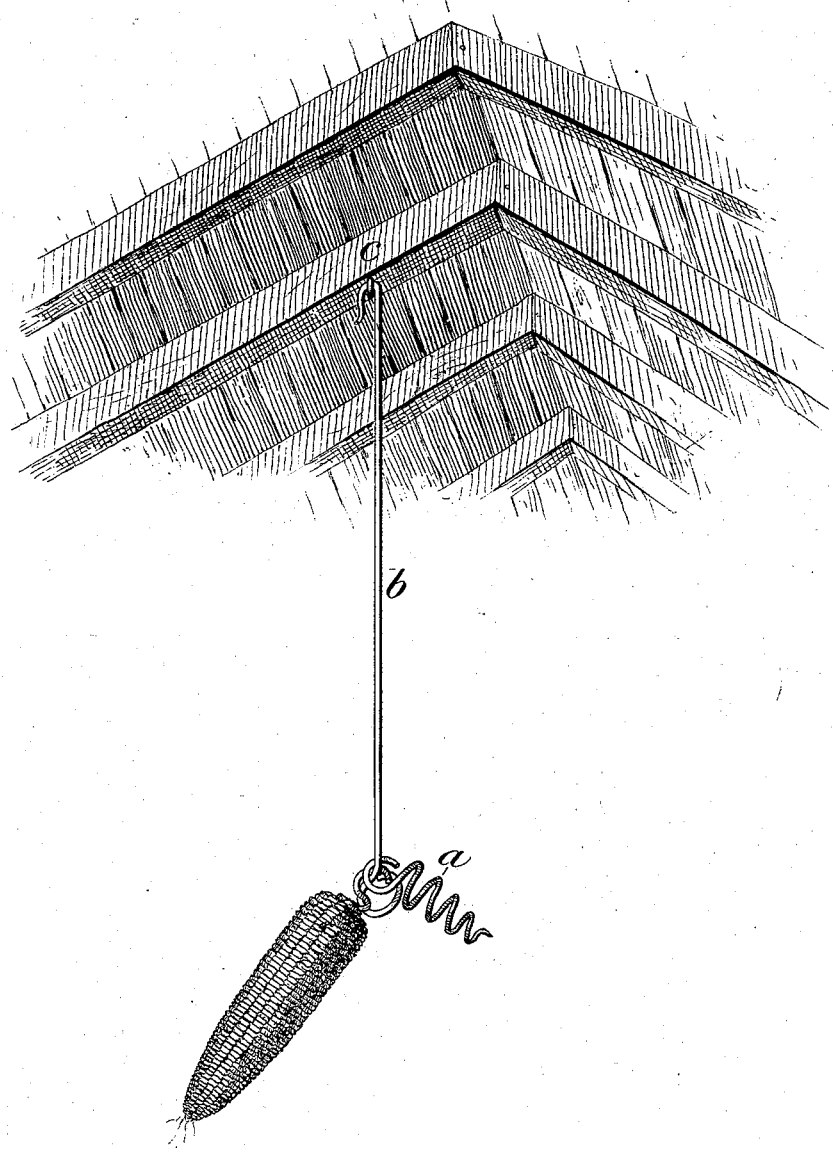
Witnesses:
Mahlon F. Smith
Inventor

UNITED STATES PATENT OFFICE.

MAHLON F. SMITH, OF MONTICELLO, INDIANA.

DEVICE FOR PRESERVING SEED-CORN.

SPECIFICATION forming part of Letters Patent No. 229,015, dated June 22, 1880.

Application filed March 1, 1880. (Model.)

*To all whom it may concern:*

Be it known that I, MAHLON F. SMITH, of Monticello, in the county of White and State of Indiana, have invented certain new and useful Improvements in Devices for Holding and Preserving Corn selected for Seed, whereby it shall be kept safely from rats and mice, and at the same time have an opportunity for becoming thoroughly dry; and I do hereby declare the following to be a full, clear, and exact description of the invention, such as will enable others skilled in the art to which it pertains to make and use it, reference being had to the accompanying drawing, which forms part of this specification.

My invention consists of a spiral cone one and one-half inch in length, made of wire or other material, with a hook on one end and point at the other. This cone screwed in the butt-end of the ear of corn, and attached by the hook to a wire or cord with hooks or loops on the ends, suspended from a beam, rafter, or joist, is inaccessible to rats and mice, and permits a free circulation of air around each ear, whereby the corn is thoroughly dried and preserved for the use intended.

The accompanying drawing represents my invention.

$a$ represents the spiral cone, with a hook at one end and point at the other, in combination with the rod or cord $b$, with hooks or loops at its ends, and attached to the support $c$.

Having thus described my invention, I claim—

The spiral cone $a$, with hook at one end and point at the other, in combination with the rod or cord $b$, with hooks or loops at the ends, suspended from the support $c$, substantially as shown and described.

In testimony that I claim the foregoing I have hereunto set my hand this 30th day of December, A. D. 1879.

MAHLON F. SMITH.

Attest:
ELISHA WARDEN,
JONES BRESSLEY.